(12) United States Patent
Choi

(10) Patent No.: US 8,650,097 B2
(45) Date of Patent: Feb. 11, 2014

(54) SYSTEM AND METHOD FOR STREAMLINED REGISTRATION OF PRODUCTS OVER A COMMUNICATION NETWORK AND FOR VERIFICATION AND MANAGEMENT OF INFORMATION RELATED THERETO

(76) Inventor: Yu Yung Choi, Brooklyn, NY (US)

( * ) Notice: Subject to any disclaimer, the term of this patent is extended or adjusted under 35 U.S.C. 154(b) by 740 days.

(21) Appl. No.: 12/325,152

(22) Filed: Nov. 29, 2008

(65) Prior Publication Data
US 2009/0144074 A1   Jun. 4, 2009
US 2009/0287498 A2   Nov. 19, 2009

Related U.S. Application Data

(60) Provisional application No. 60/991,759, filed on Dec. 3, 2007.

(51) Int. Cl.
*G06Q 10/00* (2012.01)

(52) U.S. Cl.
USPC .......................................... 705/28; 235/235

(58) Field of Classification Search
None
See application file for complete search history.

(56) References Cited

U.S. PATENT DOCUMENTS

| | | |
|---|---|---|
| 6,206,282 B1 | 3/2001 | Hayes, Sr. et al. |
| 6,249,227 B1 | 6/2001 | Brady et al. |
| 6,453,417 B1 | 9/2002 | Milios et al. |
| 6,788,800 B1 | 9/2004 | Carr et al. |
| 6,886,748 B1 | 5/2005 | Moore |
| 6,965,886 B2 | 11/2005 | Govrin et al. |
| 7,000,834 B2 | 2/2006 | Hind et al. |
| 7,042,335 B2 | 5/2006 | Franks |
| 7,072,892 B2 | 7/2006 | Hertz et al. |
| 7,172,117 B2 | 2/2007 | Moore |
| 7,230,534 B2 | 6/2007 | Elledge |
| 7,375,614 B2 | 5/2008 | Franks |
| 2002/0032626 A1* | 3/2002 | DeWolf et al. .................. 705/35 |
| 2005/0035860 A1* | 2/2005 | Taylor et al. ............... 340/572.1 |
| 2005/0114270 A1* | 5/2005 | Hind et al. ....................... 705/64 |
| 2005/0146006 A1 | 7/2005 | Yamazaki et al. |
| 2005/0168339 A1 | 8/2005 | Arai et al. |
| 2007/0103274 A1* | 5/2007 | Berthold .................... 340/10.51 |
| 2007/0109103 A1* | 5/2007 | Jedrey et al. .................. 340/10.5 |
| 2007/0210923 A1* | 9/2007 | Butler et al. ............... 340/572.8 |

OTHER PUBLICATIONS

"RFID's: Security Challenge", Claburn, Thomas; Hulme, George V., InformationWeek 1014( Nov. 15, 2004), p. 49.*
DeWold, Frederik M., et al., U.S. Patent App.: 200200032626, Filing Date: May 2, 2001.

* cited by examiner

*Primary Examiner* — M. Thein

(57) ABSTRACT

The system and method of the present invention provide a data communication between unique ID (UID) registration center and electronic (or other) products, and the product's data management. The UID is previously assigned and integrated or embedded to the product, where the UID of each product is registered with one or more particular UID registration centers over at least one communication network. Each UID is operable to securely store and selectively provide access to predefine location in the product and corresponds to data file at the UID registration center, with data file being inclusive of information related to the product purchase history, current ownership, etc., and wherein one or more authorized parties may subsequently advantageously utilize at least one UID to access, verify, edit, transfer, transmit, and/or otherwise manage at least one information item, including ownership right related to one or more corresponding registered products in the UID registration center.

29 Claims, 10 Drawing Sheets

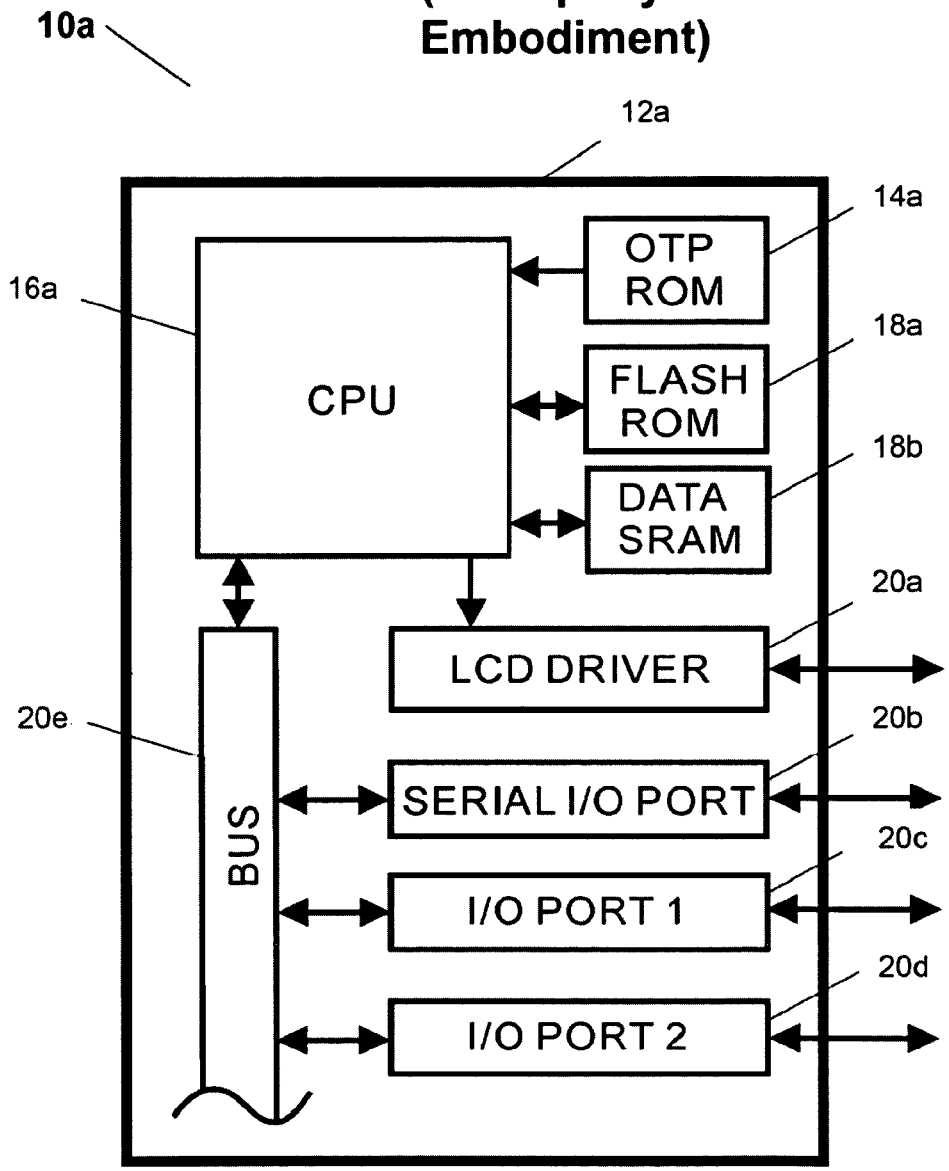

(Exemplary Embodiment)

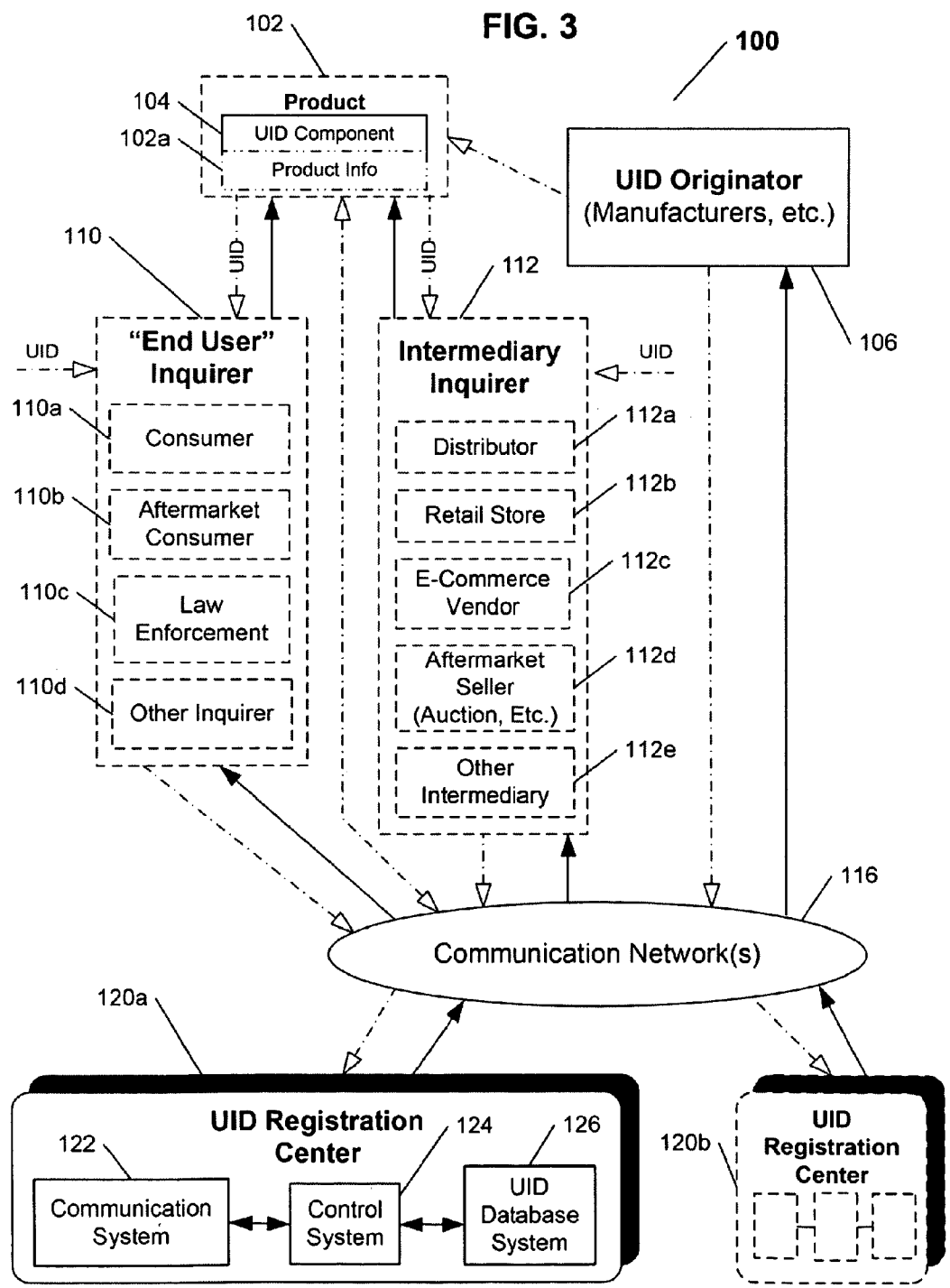

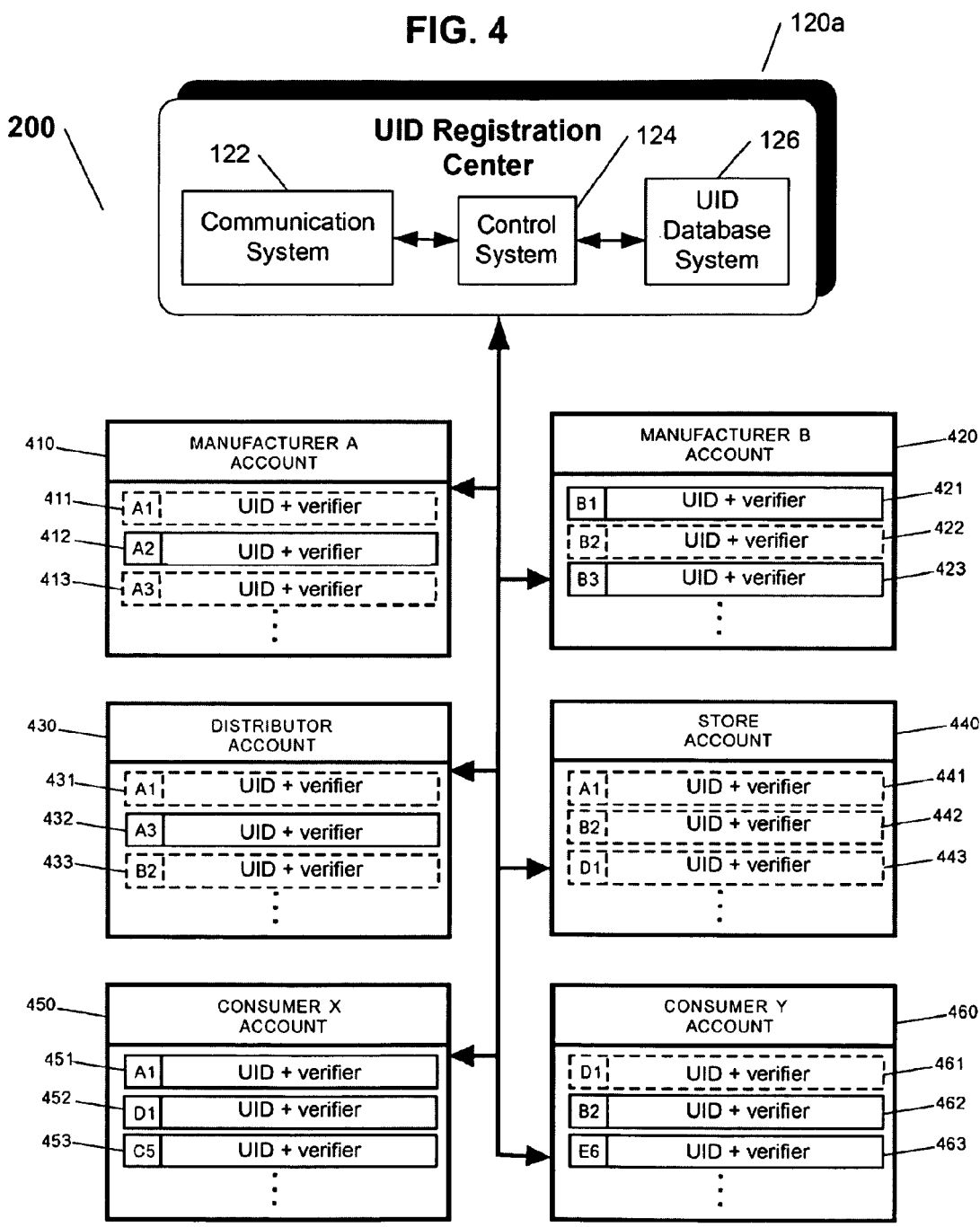

(Exemplary Embodiment)

(Exemplary Embodiment)

(Exemplary Embodiment)

SYSTEM AND METHOD FOR STREAMLINED REGISTRATION OF PRODUCTS OVER A COMMUNICATION NETWORK AND FOR VERIFICATION AND MANAGEMENT OF INFORMATION RELATED THERETO

CROSS-REFERENCE TO RELATED APPLICATIONS

The present patent application claims priority from the U.S. Provisional Patent Application of Yu Yung Choi entitled "METHOD AND SYSTEM FOR REGISTERING AND VERIFYING THE ELECTRONIC PRODUCT ON THE INTERNET" (Ser. No. 60/991,759), filed on Dec. 3, 2007.

FIELD OF THE INVENTION

The present invention relates to a system and method for registration of electronic products each having a unique identification code pre-assigned thereto with a centralized registration center, and subsequently utilizing at least one unique identification code to obtain one or more information items related to each registered product from the registration center, and more particularly to a system and method for streamlined registration, with one or more registration centers over at least one communication network, of electronic products each having a unique identification code pre-assigned thereto that is associated with one or more data records stored in a corresponding file at a predetermined registration center, and later utilizing at least one unique identification code to access, verify, edit, transfer, transmit, and otherwise manage at least one information item related to each registered product in its corresponding registration center data record.

BACKGROUND OF THE INVENTION

In the past several decades, there has been an unprecedented and ever-accelerating growth in availability and sheer quantity and variety of increasingly complex and popular technological items, especially with respect to electronic products and other products ranging from mobile telephones, to media storage and playback products, to personal digital assistants (PDAs), to portable and other types of computers, and so on. However, this course of events has brought about a number of significant and escalating challenges across a wide spectrum of circumstances.

Because of the rapid advances in technological developments, many electronic products are constantly replaced with newer models in relatively short product cycles (some measured in months), which, coupled with the desire of the some consumers to have the "latest and greatest" and the goals of other consumers to find "bargains", lead to a proliferation of a number of secondary markets for pre-owned products.

These markets are quite enormous in scope, and are bolstered by the access to a vast worldwide customer base through popular online auction sites and ready availability of easy to use and inexpensive person-to-person sales facilitators (such as local buy-sell online listings). However, in all types of aftermarket sales, there is an enormous problem with fraud (such as an online auction seller misrepresenting that they actually have the offered electronic product in hand, or that they are in fact the legitimate owner of the product), counterfeiting of expensive products, misrepresentations about item repair histories, ownership records, warranties, age, and so on.

It should also be noted that because many electronic products are in consistent demand, and with quite a few types of these products being expensive, they are often targets for theft or other misappropriation, or otherwise figure in various other types of illegal activities as was noted above (such as fraud, counterfeiting, etc.). In many cases, even if stolen or otherwise misplaced items are recovered by law enforcement, it is very difficult, if not impossible, to determine and/or verify ownership.

In addition, product manufacturers rely on establishing, developing and growing a loyal customer base and are always interested in gathering information from purchasers/owners of their products. Most often, this information is gathered though voluntary registration of the products with the manufacturer by their users/owners, for which incentives are often offered (or penalties established for failure to register—such as loss of warranty). Because many users never bother to register their products/products, manufacturers are always looking for incentives to encourage registrations.

Moreover, many product purchasers/users often alter or otherwise misrepresent product purchase information by registering it long after the original purchase date in an effort to extend the effective coverage period of product warranty. Paper receipts issued by most product vendors may be easily forged or otherwise altered. This results in significant losses to manufacturers.

There are a number of reasons why the above challenges have remained largely unmet—these reasons include, but are not limited to, at least one of the following:

(1) the difficulty in obtaining certain specific information about each particular unique electronic product (authenticity, legal status (whether the product is stolen, etc.), purchase records, ownership records and history, warranty/repair history, etc.)—hereinafter the "PRODUCT RECORD", (2) the difficulty in linking the PRODUCT RECORD to its corresponding electronic product and in maintaining the link over time; and (3) the difficulty in obtaining, verifying, tracking, and otherwise managing PRODUCT RECORDs.

The above-noted difficulties are not surprising, due to the fact that for decades, the only manner in which each particular electronic product was through its serial number assigned by the product manufacturer. A product serial number is typically printed on, engraved on, or most often otherwise attached to an outer surface of the product (such as printed on a sticker or metal or plastic tape glued to the device). In some cases, serial numbers are provided on an inner surface of the device, such as inside its housing, under a removable battery, etc.). As a result, in the vast majority of cases, serial numbers are quite easy to remove, obscure, or alter. Moreover, because each product manufacturer provides its own serial numbers using its own numbering scheme, most often without regard for serial number nomenclature of other manufacturers, in certain cases, serial numbers for different products from different manufacturers may be identical or confusingly similar to one another. In view of the sheer and ever-growing quantity of available electronic products, this occurrence continues to become increasingly more frequent. Thus, currently, no serial number can ever really be assured of being "unique".

In recent years certain electronic products have been introduced that store serial numbers in digital memory in addition to, or in lieu of, those numbers being physically provided on the device. In cases where serial numbers are only provided in electronic form, the numbers are not visibly displayed to product users for inspection, but are only capable of being retrieved through use of external electronic devices (such as computers) utilizing specially configured software (e.g., typically provided by the manufacturer to authorized personnel).

For the above reasons, product serial numbers were exclusively utilized by the respective product manufacturers, and/or by repair/service providers, for warranty activation and administration, product update and recall notifications, and in connection with the provision of product configuration maintenance/repair services. Primary and aftermarket consumers, law enforcement personnel, product users, and other inquiring parties were not able to use serial numbers to any significant extent, especially because certain potentially very useful information was simply not available in connection with the serial numbers.

In the above-mentioned cases, where serial numbers are digitally stored in certain electronic products, significant problems can arise in connection with unauthorized manipulation thereof. By way of example, each mobile telephone includes an International Mobile Equipment Identity (IMEI) number stored in its memory, which can be viewed on the phone display screen in response to certain commands. However, on many mobile telephones, it is possible to alter the IMEI number utilizing a computer or equivalent device equipped with special software configured for that purpose, whether by the manufacturer or, more typically, by an unauthorized third party. Even a cursory Internet search, will readily reveal dozens of "hacking" solutions for modifying the IMEI number of most mobile telephones available on the market.

Because the IMEI number is used by the GSM (Global System for Mobile communications) network to identify valid mobile devices, it can therefore be used to stop a stolen phone from accessing the network, fraudulent alteration thereof may enable a perpetrator to use a stolen or otherwise unlawfully obtained mobile telephone with an altered IMEI number, to misappropriate communication and/or data services. It should also be noted that the IMEI number is most often only used to identify a specific mobile telephone, and is not in any way linked to, or associated with, a mobile service subscriber using the telephone.

Certain attempts to address the numerous challenges above have been made, but none have achieved any measurable commercial success, and none have gained any significant degree of widespread implementation. By way of example, U.S. Pat. No. 6,259,367 and U.S. Pat. No. 7,222,791 have proposed utilizing bar code labels, RFID tags, and/or magnetic tags affixed to various products, in conjunction with appropriate compatible "reader devices" and other system component, for product identification, verification, and related product information management. However, these solutions still suffer from significant disadvantages of the previously known product information gathering and management approaches. For example, in each case, the data-containing, magnetic, and/or electronic labels and/or tags are easy to remove, alter, or erase by physical action. Furthermore, none of the suggested solutions address the challenge of ensuring the implementation and use of truly unique "serial numbers" or equivalents across different manufacturers and/or products.

Other solutions have been proposed that focus on tracking ownership, and verifying the authenticity, of certain products and valuable items (such as artwork). However, all of these solutions require modification of the system and method.

It would thus be desirable to provide an electronic product-related information registration, verification, and management system and method by providing electronic products with a unique ID ("UID") assigned to each product and stored in an integrated or embedded product component in such a manner as to (1) make the UID readily available to an inquirer, and (2) make the UID virtually impossible to remove or change without destroying or seriously damaging its corresponding product, and to provide at least one registration center operable to store and enable conditional access to, at least one information record linked to each product through its UID, such that the at least one information record may be advantageously accessed and/or managed by at least one authorized inquirer through use of the UID.

It would also be desirable to provide a system and method for ensuring that the UIDs assigned to various electronic products are not duplicated, regardless of different product manufacturers. It would further be desirable to provide an embedded or integrated UID component for electronic products operable for at least one of: (1) selective activation in response to one or more predetermined criteria (e.g., an authorized inquirer request, etc.), (2) display of the UID to an inquirer, for example by use of a product's display component, (3) proximity-limited transmission of the UID from the component to a preconfigured UID receiver, (4) wireless transmission (preferably secure) of the UID from the component to a an authorized receiving system, (5) transmission (preferably secure) of the UID through a physical electronic connection to an authorized requesting component or system.

It would additionally be desirable to provide an electronic product-related information registration, verification, and management system and method for electronic products each having a UID assigned thereto and securely stored therein in an integrated and/or embedded component thereof, that comprises at least one UID registration center, each having a communication system operable to receive UID and other information, over at least one communication network, a control system, and a UID database system that comprises a plurality of data records each linked to a particular UID stored in a corresponding UID registration center database file, such that at least one authorized inquirer is able to utilize a particular UID (preferably in conjunction with provision of a verifier to verify authorization) to access, verify, edit, transfer, transmit, and otherwise manage at least one information item related to each registered product in its corresponding UID registration center database file.

It would also be desirable to provide a system and method for ensuring that the integrated/embedded UID components (and the corresponding UIDs) assigned to various electronic products, are configured for use in conjunction with various conventional and future shipping, storage, inventory, tracking, etc. systems.

It would moreover be desirable to provide a system and method for electronic product information registration, verification and management for use in conjunction with electronic products supplied with UIDs, in which at least one UID registration center database further comprises user accounts for parties including, but not limited to, at least one of the following: product manufacturers, product distributors, retail stores, e-commerce stores, consumers, etc., where each account is associated with one or more UIDs that each corresponds to its UID registration center database file (as described above).

It would furthermore be desirable to provide a system and method for UID-based electronic product information registration, verification and management in which, in conjunction with creation of a UID registration center file for a particular electronic product (i.e., during electronic product UID registration), the registrant is provided with at least one verifier, each operable to at least one of: (1) ensure that subsequently only an authorized party may access the file by supplying a provided verifier to the registration center control system, (2) ensure that prior to activation by an electronic product seller, cannot be used to access the UID registration center file to guard against theft, loss, or other misappropriation of the corresponding electronic product, during transit from the seller to a buyer, and (3) when provided for a product manufacturer, ensure that the verifier is associated with each particular product UID and stored in the corresponding UID registration center file linked to the manufacturer's user account, such that the verifier is provided to a purchaser of the particular electronic product to facilitate ready registration thereof with the UID registration center.

It would additionally be desirable to enable a product manufacturer with an account at the UID registration center to automatically transmit and enter, at least one product information item associated with each particular product's UID, into that product's corresponding UID registration center database file, with the at least one product information item including, but not being limited to at least one of the following: manufacturer name, contact information, product brand name, model name/number, production date, warranty information, technical support information, and so on.

It would likewise be additionally be desirable to enable an electronic product sales intermediary party having an account at the UID registration center (e.g., distributor, store, aftermarket seller, etc.), to add product historical information to a particular registered product's UID registration center database file, including, but not limited to, at least one of the following: name/contact information of distributor, name/contact information of store, purchase date, return date, and service/warranty claims, status (lost, stolen, returned to manufacturer, reconditioned, etc.), with each information item being optionally time-stamped. It would also be desirable, to selectively ensure that all, or a predetermined portion, of product historical information stored in the UID registration center database file, is prevented from being edited or deleted.

It would furthermore be additionally be desirable to enable a consumer (or another end-user party), a distributor, a store, an after-market seller, or another party having an account at the UID registration center, to add/update/edit certain product information to a particular registered product's UID registration center database file, including, but not limited to, at least one of the following: name/contact information of owner, name/contact information of store, purchase date, return date, service/warranty claims, status (lost, stolen, returned to store or manufacturer, reconditioned, etc.), with each information item being optionally time-stamped. It would also be desirable, to enable the consumer selling a particular electronic product to a buyer, to transfer the UID registration center database file corresponding to the UID of the product being sold, to the buyer, such that the buyer is able to access the UID registration center database file and link the file to their existing (or newly created) account.

It would moreover be desirable to provide an additional access platform to enable other inquiring parties to connect to at least one UID registration center, seeking to verify particular product information through the use of UIDs for various purposes (such as to enable law enforcement officers to determine the status (stolen, etc.) of a recovered electronic product, and to locate the owner of a recovered stolen product, or to enable a person who finds a lost product, to contact its owner and return it).

BRIEF DESCRIPTION OF THE DRAWINGS

In the drawings, wherein like reference characters denote corresponding or similar elements throughout the various figures:

FIG. 1B is a schematic diagram of a first exemplary alternate embodiment of the inventive UID component of FIG. 1A, implemented by way of example, as an integrated circuit (IC) comprising corresponding sub-components;

FIG. 3 is a schematic diagram of an exemplary embodiment of an infrastructure of the inventive product information registration, verification and management system that incorporates at least one UID registration center, and that is usable by various parties having accounts therewith;

FIG. 4 is a schematic diagram of an exemplary embodiment of an implementation of user accounts and UID registration center files in conjunction with utilization of the inventive system infrastructure of FIG. 3;

SUMMARY OF THE INVENTION

Figure 1A:
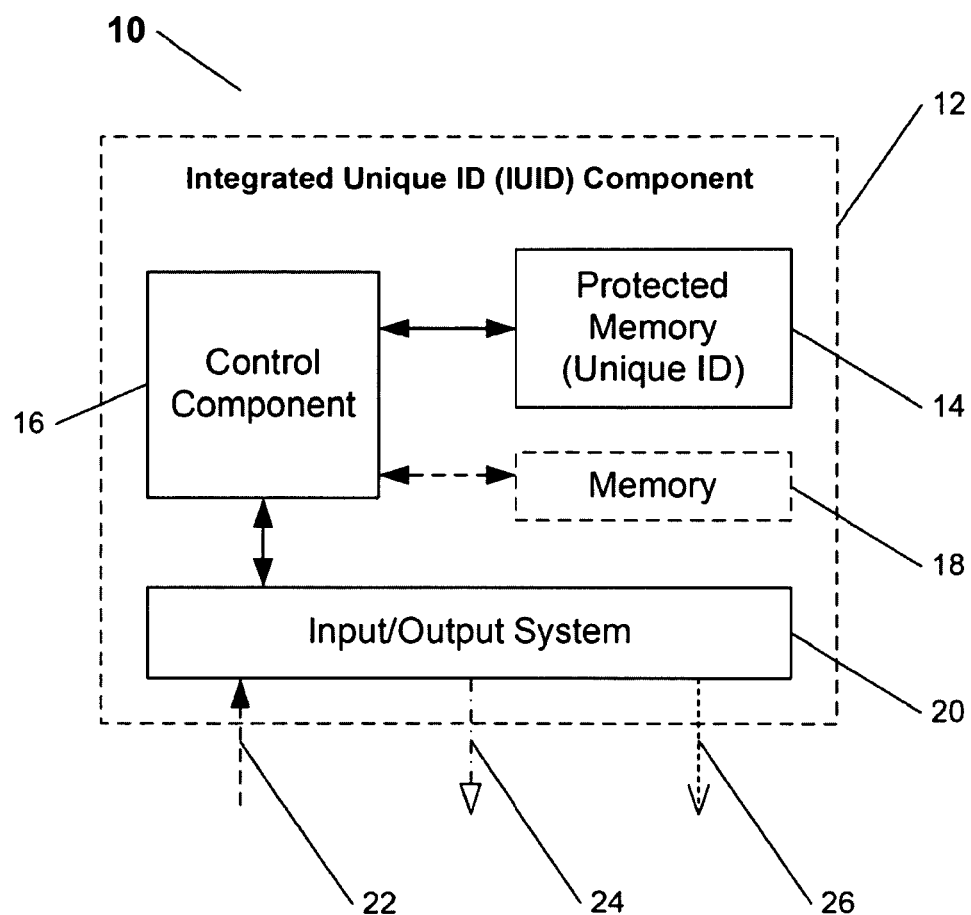
FIG. 1A is a schematic diagram of a first exemplary embodiment of a novel component, integrated into a particular electronic product, operable, in accordance with the present invention, to securely store, protect, and, in response to an authorized inquiry thereto, provide a unique ID (UID) previously assigned to the particular electronic product.

The system and method of the present invention address and resolve all of the disadvantages of the previously known relevant solutions by advantageously providing integrated or embedded components, for electronic (or other) products, each operable to securely store and selectively provide access to, a unique ID ("UID") previously assigned to its corresponding specific product, where the UID of each product is registered with one or more particular UID registration centers over at least one communication network, and associated with one or more data records stored in a corresponding database file at the particular UID registration center, the data records being inclusive of information related to the product, the product purchase history, current ownership, etc., and wherein one or more authorized parties may subsequently advantageously utilize at least one UID (and optionally a verifier) to access, verify, edit, transfer, transmit, and/or otherwise manage at least one information item related to the one or more corresponding registered products in their UID registration center database file.

In addition, the inventive system and method advantageously provide an optimized process for verifiable transfer of ownership rights between a product's authorized owner and intended recipient the transfer process being implemented over at least one communication network with graphical user interfaces provided for each party, where the transfer of ownership rights involves association of the product's UID with the receiving party's data record and confirming ownership transfer, and optional transfer of additional product-related information from the former product owner to the current recipient.

In one of its exemplary embodiments, the novel electronic product-related information registration, verification, and management system and method provides electronic (or other) products with a unique ID ("UID") assigned to each product and stored in an integrated or embedded product component in such a manner as to: (1) make the UID readily available to a (preferably authorized) inquirer, and (2) make the UID virtually impossible to remove or change without destroying or seriously damaging its corresponding product, and further comprises least one registration center operable to store and enable conditional access to, at least one information record linked to each product through its UID, such that the at least one information record may be advantageously accessed and/or managed by at least one authorized inquirer through use of the UID.

In another exemplary embodiment thereof, the inventive system and method ensure that the UIDs assigned to various electronic products are not duplicated, regardless of different product manufacturers, and provide an integrated or embedded UID component for electronic (or other) products operable for at least one of:
(1) selective activation in response to one or more predetermined criteria (e.g., an authorized inquirer request, etc.),
(2) display of the UID to an inquirer, for example by use of a product's display component,
(3) proximity-limited transmission of the UID from the component to a preconfigured UID receiver,
(4) wireless transmission (preferably secure) of the UID from the component to a an authorized receiving system, and
(5) transmission (preferably secure) of the UID through a physical electronic connection to an authorized requesting component or system.

In another of its exemplary embodiments, the inventive electronic product-related information registration, verification, and management system and method is provided for electronic products each having a UID assigned thereto and securely stored therein in an integrated and/or embedded component thereof, that comprises at least one UID registration center, each having a communication system operable to receive UID and other information, over at least one communication network, a control system, and a UID database system that comprises a plurality of data records each linked to a particular UID stored in a corresponding UID registration center database file, such that at least one authorized inquirer is able to utilize a particular UID (preferably in conjunction with provision of a verifier to verify authorization) to access, verify, edit, transfer, transmit, and otherwise manage at least one information item related to each registered product in its corresponding UID registration center database file. The inventive system and method also advantageously ensure that the integrated/embedded UID components (and the corresponding UIDs) assigned to various electronic and other products, are configured for use in conjunction with various conventional and future shipping, storage, inventory, tracking, etc. systems.

In yet another embodiment of the present invention, a novel system and method for electronic product information registration, verification and management for use in conjunction with electronic products supplied with UIDs, is provided with an infrastructure in which at least one UID registration center database further comprises user accounts for parties including, but not limited to, at least one of the following: product manufacturers, product distributors, retail stores, e-commerce stores, consumers, etc., where each account is associated with one or more UIDs that each corresponds to its UID registration center database file (as described above).

In an additional exemplary embodiment of the present invention, a novel system and method is provided for UID-based electronic product information registration, verification and management, in which, in conjunction with creation of a UID registration center file for a particular electronic product (i.e., during electronic product UID registration), the registrant is provided with at least one verifier, each operable to at least one of:
(1) ensure that subsequently only an authorized party may access the file by supplying a provided verifier to the registration center control system,
(2) ensure that prior to activation by an electronic product seller, cannot be used to access the UID registration center file to guard against theft, loss, or other misappropriation of the corresponding electronic product, during transit from the seller to a buyer, and
(3) when provided for a product manufacturer, ensure that the verifier is associated with each particular product UID and stored in the corresponding UID registration center file linked to the manufacturer's user account, such that the verifier is provided to a purchaser of the particular electronic product to facilitate ready registration thereof with the UID registration center.

Advantageously, the various above-described exemplary embodiments of the inventive system and method, may include one or more of the following exemplary embodiments of UID registration center account features:
(1) Provision of a product manufacturer with an account at the UID registration center, that may be selectively utilized to automatically transmit and enter, at least one product information item associated with each particular product's UID, into that product's corresponding UID registration center database file, with the at least one product information item including, but not being limited to at least one of the following: manufacturer name, contact information, product brand name, model name/number, production date, warranty information, technical support information, and so on;
(2) Enabling an electronic (or other) product sales intermediary party having an account at the UID registration center (e.g., distributor, store, aftermarket seller, etc.), to add product historical information to a particular registered product's UID registration center database file, including, but not limited to, at least one of the following: name/contact information of distributor, name/contact information of store, purchase date, return date, and service/warranty claims, status (lost, stolen, returned to manufacturer, reconditioned, etc.), with each information item being optionally time-stamped. In a preferred embodiment of the present invention, the novel system selectively ensures that all, or, optionally, a predetermined portion, of product historical information stored in the UID registration center database file is prevented from being edited or deleted;

(3) Enabling a consumer (or another end-user party), a distributor, a store, an after-market seller, or another party having an account at the UID registration center, to add/update/edit certain product information to a particular registered product's UID registration center database file, including, but not limited to, at least one of the following: name/contact information of owner, name/contact information of store, purchase date, return date, service/warranty claims, status (lost, stolen, returned to store or manufacturer, reconditioned, etc.), with each information item being optionally time-stamped;

(4) Enabling a consumer selling a particular electronic (or other) product to a buyer, to transfer the UID registration center database file, corresponding to the UID of the product being sold, to the buyer, such that the buyer is able to access the UID registration center database file, and link the file to their existing (or newly created account); and (5) Providing an additional access platform to enable other inquiring parties to connect to at least one UID registration center, seeking to verify particular product information through the use of UIDs for various purposes (such as to enable law enforcement officers to determine the status (stolen, etc.) of a recovered electronic product, and to locate the owner of a recovered stolen product, or to enable a person who finds a lost product, to contact its owner to make arrangements for a return thereof).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The system and method of the present invention remedy the disadvantages of all previously known techniques, systems and methodologies relating to registration, verification, and management of information related to various goods, and particularly to electronic or other valuable products or devices.

In essence, in various embodiments thereof, the inventive system and method advantageously provide novel integrated or embedded components (or novel feature sets, implemented, for example, as hardwired functions or program instruction sets in multipurpose electronic systems or components), for electronic (or other) products, each such component operable to securely store and selectively provide access to, a unique ID ("UID") previously assigned to its specific corresponding product, where the UID of each product is preferably registered with one or more particular UID registration centers, over at least one communication network, and associated with one or more data records stored in a corresponding database file at the particular UID registration center, linked to the products UID. The product data records are preferably inclusive of various information items related to the product, that may include, but that are not limited to, one or more of the following:

technical and/or warranty information about the product itself, product condition status (product servicing, and maintenance history, whether the product is reconditioned or refurbished, whether under current warranty, whether the product is "new old stock", etc.), product manufacturer information, date/place of first purchase (e.g., store contact information), the product's ownership history, inclusive of its current ownership, with current owner contact information, and the status of the product (lost, stolen, etc.), Advantageously, in accordance with various embodiments of the inventive system and method, after registration of product UIDs in conjunction with the creation and configuration of corresponding UID registration center database files, and population thereof with at least one relevant product data record, one or more authorized parties (such as the product owner (e.g., a consumer), the product manufacturer, a product sales intermediary(ies) (e.g., distributor, store, aftermarket seller) may subsequently advantageously utilize the product's UID (and optionally a verifier previously assigned thereto during registration or otherwise lawfully provided thereto (e.g., from the manufacturer, or from the product's seller during purchase thereof), to access, verify, edit, transfer, transmit, and/or to otherwise manage at least one data item in the UID registration center database file that corresponds to the proffered UID (and optionally that also corresponds to the predetermined verifier).

It should be noted that while the various exemplary embodiments of the inventive system and method are described with reference to "electronic products", and/or to "devices", it should be understood that the novel and advantageous inventive principles and techniques disclosed herein can be readily configured, adapted, and/or applied for use with any goods (whether electronic or not), that are capable of including and/or incorporating the inventive integrated, or an embedded, UID component (such as an embodiment of the inventive UID components of FIG. 1 or 2, described in greater detail below, as a matter of design choice, and without departing from the spirit of the present invention.

Advantageously, unlike previously known means for uniquely identifying products, in accordance with the present invention, in a preferred embodiment thereof, a product's UID is not changeable by anyone without causing damage to, or destroying the product in question. Alternately, the entire component containing the UID may be changed only by a party having authorized access to special equipment/tools/information available only to the product's manufacturer. Optionally, while the UID may be readable from the product (e.g., displayable either on the product itself (if the product has a screen), or through an appropriate device capable of reading and displaying the UIDs), the exact location of the UID in the product or in the product electronic circuitry (i.e., in which specific IC or register is the UID stored) may be kept secret and known only to the authorized party assigning the UID to the product (e.g., manufacturer, etc.). In an alternate embodiment of the invention, the UID may be unchangeable by anyone as noted above, except by the authorized party that originally assigned the UID to the product.

Referring now to FIG. 1A, a first exemplary embodiment of a novel product component configured for integration into a particular electronic (or other) product or device, is shown as an integrated UID component 10, being operable, in accordance with the present invention, to securely store, protect, and, in response to an authorized inquiry thereto, provide a unique ID (UID) previously assigned to the particular product. The UID component 10 includes a control component 16, a protected memory 14 for storing the UID (and optionally for storing other information), and an input/output system 20 configured for receiving signal 22 and sending out signals 24, 26. Optionally, the component 10 may be implemented in a housing 12.

Referring now to FIG. 1B, a first exemplary alternate embodiment of the inventive UID component 10 of FIG. 1A is shown as an UID component 10a, implemented by way of example as an integrated circuit (IC) 12a (or an equivalent component), comprising corresponding sub-components as described below. By way of example, the UID component 10a is configured for preferable use with a product which comprises an integral display component operable to display the UID in response to an authorized request therefor, as described below. The IC 12a contains a CPU (central processing unit) 16a, an OTP ROM 14a for storing the UID, a flash ROM 18a, a data SRAM 18b, an LCD driver 20a (for example for driving an LCD display component (not shown) of the product in which the component 10a is installed), a serial I/O port 20b, an I/O port-1 20c, an I/O port-2 20d, and a data bus 20e.

When a request is made to display the UID on the product's integrated display (not shown), this request is transmitted to the component 10a from the product's input component (not shown, such as a keypad, button, touchscreen control, or equivalent, and arrives as a signal through I/O port-1 20c, and then passes through the data bus 20e into the CPU 16a. The CPU 16a operates in accordance with program instructions stored in the memory of Flash ROM 18a, and has access to, and is capable of utilizing, the data SRAM 18b. The CPU 16a then retrieves the UID from OTP ROM 14a, and processes the UID as data, thereafter sending it to the LCD Driver 20a to output to the product display and to thus display the UID for verification or for other purpose.

A request for the UID may also be made to the UID component 10a through data communication (for example such as a request by the owner or other possessor of the product to transmit the UID to some other external (e.g., remote) system (ranging from a proximal reader to a centralized UID and product information database system), for example for the purposes of UID registration, UID verification, or for any other applicable purpose. In the case of such a data communication UID request, the applicable signal arrives through I/O port-2 20d, and then passes through data bus 20e into the CPU 16a in accordance with the programming stored in the memory of Flash ROM 18a, and in the data SRAM 18b. The CPU 16a then retrieves the UID stored in the OTP ROM 14a, and, after processing, sends the UID as data through the data bus 20e to the I/O port-2 20d to the external (e.g., remote) system for the designated purpose (e.g., registration, verification, etc.).

The IC 12a can be a microprocessor, a microcontroller, a chipset (northbridge, etc.), or equivalent solid state or other form of logic circuitry that is configured for storing and processing information. Because components such as the IC 12a are present in abundance in virtually all electronic products, in one embodiment of the invention, the UID and the relevant program instructions for its storage, processing, retrieval, display, and transmittal may be implemented in the existing components/circuitry of the product, without requiring any new components or without requiring physical modification of the product's electronics. Optionally, the specific location of the UID and the relevant program instructions related thereto, may be determined secretly by the originator of the UID (such as the product manufacturer). In an alternate embodiment of the invention, if the product does not possess the necessary components/circuitry to provide the above-described UID-related functionality, the IC 12a may be implemented as an additional component added to the product mainboard/motherboard, or equivalent, specifically for the purpose of providing the necessary UID-related functionality.

Regardless of the type of IC 12a-related implementation, in a preferred embodiment of the invention, the UID cannot be changed by any means, and can only be disabled by damaging or destroying the product itself. Even if the IC 12a associated with the UID is identified, any attempted UID change would require replacement of the IC 12a, which would certainly damage the product.

Figure 2A:
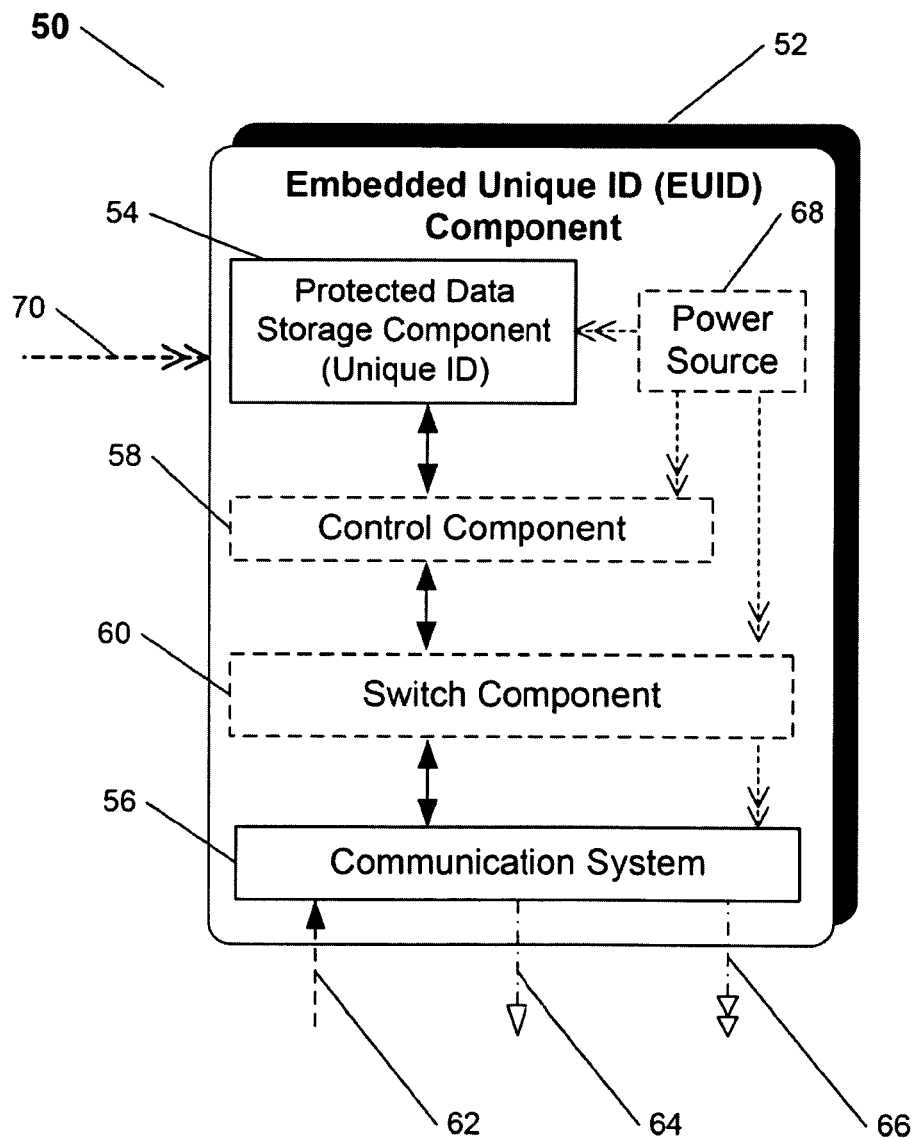
FIG. 2A is a schematic diagram of a second exemplary embodiment of a novel component, embedded into a particular product, operable, in accordance with the present invention, to secure store, protect, and in response to an authorized inquiry thereto, selectively provide, in a passive or an active manner, a unique ID (UID) previously assigned to the particular product, and that may also be selectively deactivated and/or activated by the user thereof.

Referring now to FIG. 2A, a second exemplary embodiment of a novel product component configured for embedding into a particular electronic (or other) product or device, is shown as an embedded UID component 50, being operable, in accordance with the present invention, to securely store, protect, and, in response to an authorized inquiry thereto, in a passive or an active manner, selectively provide and/or transmit and/or broadcast a unique ID (UID) previously assigned to the particular product. The UID component 50 includes an optional control component 58, a protected memory 54 for storing the UID, and a communication system 56 configured for receiving a signal 62 and sending out signals 64, 66. Optionally, the component 50 may be implemented in a housing 52 and may receive power, either from a self-contained power source 68 (such as a battery), or may receive external power 70, or both (together or in accordance with at least one power management protocol—e.g., the component 50 may utilize the power source 70 during normal use, but switch to the self-contained source 68 if the flow of power from the source 70 is disrupted, due to source 70 being depleted or damaged (essentially functioning as a failsafe or backup)). Alternately, the component 50 may be configured as a passive device that does not require its own source of power from operation, and that may be activated only in response to a sufficiently proximal corresponding compatible UID reading device. By way of example only, the UID component 50 may be implemented as a chip, circuitry, tag, etc., that is configured to utilize one or more of remote data reading/transmission technologies, including, but not limited to: active or as a passive RFID (or equivalent), Bluetooth™, Wi-Fi, RuBee™, wireless data transmission (e.g., Bluetooth™, Wi-Fi, RuBee™, Wireless USB, magnetic contact data transfer, various high speed cellular data transmission protocols (EDGE, etc.), infrared (IR), or through any wireless data reading/transmission technology equivalent to any of the above.

Because the UID component 50 is capable of transmitting the UID in a wireless manner, in view of security and privacy concerns, in another embodiment of the invention, the UID component 50 is optionally provided with a selectively operable switch 60, which may be advantageously used by an authorized party (e.g., by the owner of the corresponding product, by law enforcement, etc.) to deactivate, or to activate, the communication system 56 (which may be an antenna, other transmitter, etc.), as may be desired to either restrict, or to allow access to the UID from external requestors.

Alternately, the UID component 50 may simply serve as a modified alternate version of an integrated component 10 (or 10a) of FIGS. 1A, (and 1B), respectively, essentially being implemented as the component 10 or component 10a, except also being supplied with predetermined wireless data transmission functionality provided by communication system 56 (and optionally by switch component 60), selectively operable to wirelessly receive UID-related instructions and to selectively wirelessly transmit the UID to a designated external recipient, in response to authorized requests. One alternate embodiment of the UID component 50, is shown in FIG. 2B and discussed in greater detail in connection therewith.

Figure 2B:
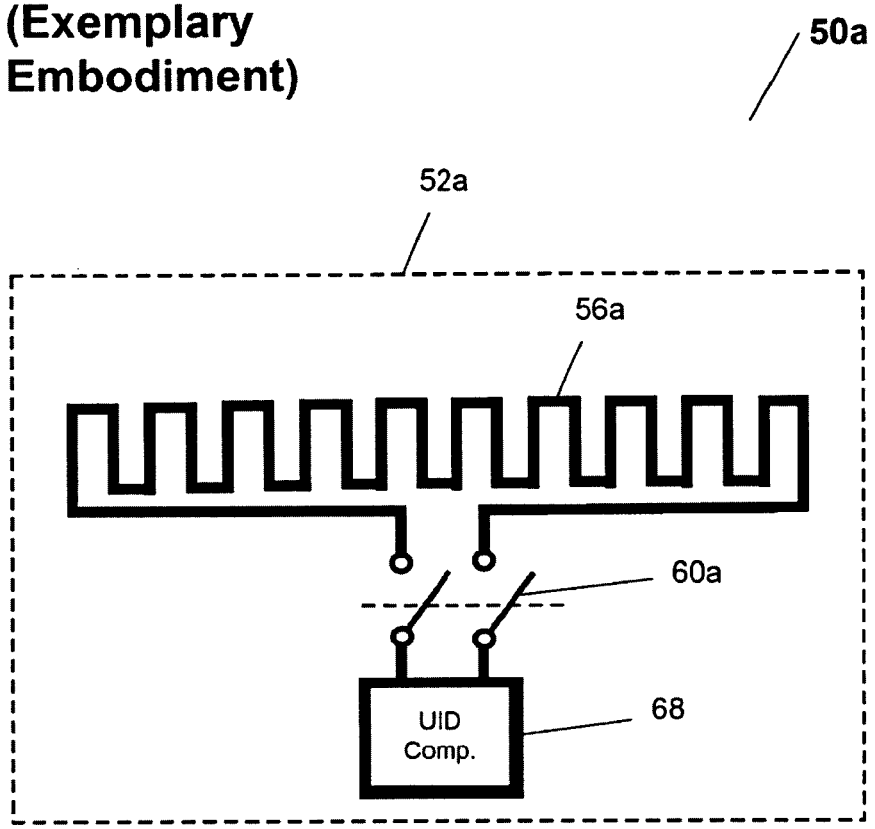
FIG. 2B is a schematic diagram of a first exemplary alternate embodiment of the inventive UID component of FIG. 2A, implemented by way of example, as an UID component that may be selectively activated and/or deactivated by a user, and that may be further selectively operable to transmit a UID in a wireless manner whether through contact or proximity with an UID reading device, or otherwise.

Referring now to FIG. 2B, a schematic diagram of a first exemplary alternate embodiment of the inventive UID component 50 of FIG. 2A, is shown as an UID component 50a, implemented, by way of example only, as an active or as a passive RFID (or equivalent) device (such as a Bluetooth™, Wi-Fi, RuBee™, or equivalent device), indicated herein as "RFID" for the sake of convenience only. In one inventive embodiment hereof, the UID component 50a may be implemented in a remotely readable tag 52a (such as an RFID or RuBee tag, or equivalent), which contains (or is connected to) a UID component 68 (such as the components 10, 10a of FIGS. 1A, 1B), switch 60a and antenna 56a. In another inventive embodiment hereof, the UID component 50a may be implemented as individual components spread through the product inclusive of the UID component 68 (such as an RFID chip, the components 10, 10a of FIGS. 1A, 1B), switch 60a and antenna 56a.

Inside the UID component 68, there is an OTP ROM (or equivalent memory) for storing the UID, logic circuitry, and communications circuitry (such as described above in connection with FIGS. 1A and 1B). Using an RFID reader (or equivalent), the UID can be read from a predetermined (for example by the UID originator, by the product manufacture, and/or by the user) distance (ranging from substantial contact with the product or component 50a, to the outer range of the remote data transmission technology implemented in the component 50a), making it convenient for tracking products incorporating the UID component 50a, such as during transportation, storage, etc., thereof.

Also, a passive or self-powered version of the UID component 50a may be used in a case when the product in which it is embedded runs out of power or is damaged such that the UID cannot be read through conventional means. As described above in connection with the UID component 50 of FIG. 2A, the UID component 52a may optionally comprise an internal power source (e.g., depending on whether it is capable of passive, active, or semi-passive operational modes). Optionally, the UID component 50a can use the power obtained from the product in which it is installed.

Advantageously, the switch 60a, positioned between the antenna 56a and the UID component 68, is provided for the product owner/operator to be able to control (by switching it on or off) remote reading/transmission functions of the UID device 50a (e.g. limiting them to contact reading only), or to switch the external access to the UID component 68 on or off entirely. These features are advantageous for addressing security issues, such as consumer privacy concerns. Advantageously, in various embodiments of the invention, the UID component 50a is embedded in the product, or is otherwise attached to the product (internally or externally), such as being inserted therein, being attached thereto, or implanted.

Referring now to FIG. 3, an exemplary embodiment of a novel infrastructure 100 of the inventive product information registration, verification and management system that incorporates at least one UID registration center, and that is usable by various parties having accounts therewith is shown. In accordance with the inventive infrastructure 100, an UID originator 106 (e.g., a party authorized to issue UIDs, such as a manufacturer, an industry authority or council, etc.), assigns a UID to a product 102 (such as an electronic device), a UID which is stored in the UID component 104 (such as any of the UID components 10, 10a, 50, or 50a (of FIGS. 1A to 2B)). The UID is pre-recorded by the ID originator 106 in a corresponding account, having multiple product-specific data records defined therein, stored at a UID registration center 120a, in a UID database system 126, and managed by a control system 124 (such as one or more computer servers and accompanying software and infrastructure). The UID registration center 120a also includes a communication system 122 operable to enable bidirectional communication with the UID originator 106 or with other parties systems (e.g., any of the systems 110, 112, or optionally even with the product 102). The UID registration center 120a may be a single centralized entity, or it may include multiple communicating or independent entities (for example classified into different industries).

In one embodiment of the invention, multiple different UID originators 106 may work together, through a centralized UID registration center 120a, to collaborate in the process of generating new UIDs, to ensure that each new UID assigned to any future products is truly unique across multiple UID originators 106, to prevent a situation in which different UID originators 106 in different industries may use the same UID for different products (e.g., to avoid a case where a UID assigned to a mobile phone of one manufacturer, may accidentally be the same as a UID assigned to a television set by another manufacturer).

In addition to its UID, the product 102 also includes a certain set of product information items associated therewith (product info 102a) which may include, but which are not limited to: product 102 ownership rights information (e.g., name i contact information of owner, name/contact information of store selling product 102, purchase date, return date, and service/warranty claims, product 102 status (lost, stolen, returned to store or manufacturer, reconditioned, etc.), product 102 manufacturer information (name, contact information, product brand name, model name/number, production date, warranty information, technical support information, etc.), with one or more of the information items 102a being optionally time-stamped.

In accordance with the present invention, under various circumstances, one or more parties other than the UID originator 106 may be authorized to access the UID of the product 102 (whether from the product itself or from an appropriate product record in the UID database system 126), access, transfer, manage, and/or change all or part of the product information 102a. These potential authorized parties may include, but are not limited to, one or more of the following: consumers, aftermarket consumers, law enforcement personnel, retail stores, E-Commerce vendors (such as on-line stores, auction websites, etc.), aftermarket sellers (through classified ads, auctions, etc.), or another inquirers (such as persons finding a lost or stolen product 102). Optionally, the various possible authorized parties may be generally categorized as being "end user" inquirers 110, i.e., parties who eventually wind up in the possession of the product 102, or "intermediary" inquirers 112, such as parties that serve as intermediaries in getting the product 102 from its manufacturer (e.g., UID originator 106), to the end-user consumer (optionally the product 102 may pass through multiple intermediary parties before ending up with the consumer).

While in one embodiment of the invention, various parties can use the product 102 itself to transmit its UID to the UID registration center 120a, and/or to access the appropriate account and product data record(s) in the UID database system 126, through the communication network(s) 116, in another embodiment of the invention, one or more of each of the "end-user" inquirers 110 may be supplied with a corresponding communication-capable systems 110a to 110d, and one or more of each of the "intermediary" inquirers 112 may be supplied with a corresponding communication-capable systems 112a to 112e, each for accessing the UID registration center 120a UID database system 126, (and optionally for accessing the UID from the product 102 UID component 104), and for performing various UID and product 102 related tasks.

The UID registration center 120a components, including the communication system 122, the control system 124, and the UID database system 126, preferably provides one or more of the following features to various parties selected from parties 110, 112:

(1) Provision of the UID originator 106 with an account at the UID registration center 120a, that may be selectively utilized to automatically transmit and enter, at least one product information item 102a associated with each particular product 102 UID, into that product 102 corresponding UID registration center database 126 product 102 record. In a preferred embodiment of the present invention, the novel system selectively ensures that all, or, optionally, a predetermined portion, of product historical information stored in the UID registration center database 126 product 102 record is prevented from being edited or deleted;

(2) Enabling an electronic (or other) product intermediary party 112 having an account at the UID registration center 120a (e.g., distributor, store, aftermarket seller, etc.), to add product 102 historical information to a particular registered product 102 UID registration center database 126 product 102 record;

(3) Enabling a consumer, or other "end-user" party 110, to establish an account at the UID registration center 120a, which may then be used to add/update/edit certain product information 102a to a particular registered product 102 UID registration center database 126 product 102 record;

(4) Enabling a seller selling a particular electronic (or other) product 102 to a buyer, to transfer the UID registration center database 126 product 102 record, corresponding to the UID of the product 102 being sold, to the buyer, such that the buyer is able to access the UID registration center database 126 product 102 record, and link the product 102 record to their existing (or newly created account); and (5) Providing an additional access platform to enable other inquiring authorized parties (from parties 110, 112) to connect to the UID registration center 120a, seeking to verify particular product information 102a, through the use of UIDs for various purposes (such as to enable law enforcement officers to determine the status (stolen, etc.) of a recovered UID-equipped product 102, and to locate the owner of a recovered stolen product 102, or to enable a person who finds a lost product 102, to contact its owner to make arrangements for a return thereof).

An exemplary process for managing various party 110, 112 UID registration database 126 accounts and corresponding product 102 records (such as for transferring product 102 ownership rights, etc.) is shown as a process 200 in FIG. 4, and described further below in connection therewith. Various exemplary embodiments of processes that may be implemented utilizing the inventive system infrastructure 100, are shown as processes 500, 600, 700, and 800 in FIGS. 5, 6, 7, and 8, respectively, and that are described by way of example in greater detail below in connection therewith.

Advantageously, the novel infrastructure 100 may be used for a variety of other customizable purposes and business processes involving product 102 sales between different parties, and/or involving other utilization of the product 102 UID and product information 102a for verification and/or transfer of product 102 physical possession or ownership rights. It should also be noted that the inventive infrastructure 100 is very flexible, and in one embodiment of the present invention, may advantageously even be used in connection with products 102 having UIDs, but lacking UID components 104 for electronically storing the UIDs (such as products having UIDs inscribed on, or inside them, etc.).

By way of example of such a utilization of the novel infrastructure 100, an E-commerce party (such as an online auction company, or an e-Commerce site usable by individual independent sellers), may require that at least a portion of its sellers (e.g., those selling items over a certain price point), provide, to the E-commerce party's system 112c, the UID of any product 102 the sellers want to post for sale, prior to the posting thereof, for verification of the seller's possession and/or ownership rights in the product 102. After each seller provides the UID of the product 102 to be posted for sale through the seller system 112d, the E-commerce party may then verify the information associated with the UID that is stored in the corresponding UID registration center database system product 102 record, matches the information being provided by the seller for the product 102 in the proposed sales posting. Optionally, the E-commerce party may utilize its own dedicated UID registration center 120b, specifically for its needs. Thus, information as to whether the product 102 being sold is actually in seller's possession, whether the product 102 had been lost or stolen, or whether the product 102 is authentic, may be readily verified. This exemplary utilization of the novel infrastructure 100 is thus advantageous in greatly reducing not only e-commerce related fraud, but also in reducing the liability that E-commerce vendors currently carry to various product manufacturers for allowing (or for failing to stop) the sale of counterfeit products through their websites.

Referring now to FIG. 4, an exemplary embodiment of an implementation process 200 of user accounts and UID registration center 120a database system 126 records (referred to herein as "files" by way of example only) in conjunction with utilization of the inventive system infrastructure 100 of FIG. 3, is shown. The process 200 that the registration center 120a (through its control system 124) enables processing and transferring of various electronic product 102 files between different accounts, created in the UID database system 126, for various authorized parties (i.e., manufacturers (e.g., UID originators 106), distributors, stores, and consumers). These accounts, by way of example, include a manufacturer A account 410, a manufacturer B account 420, a distributor account 430, a store account 440, a consumer X account 450, and a consumer Y account 460, all of which are opened and configured by, or for, the corresponding parties through the control system 124, and that are stored in the database 126. Each account contains may contain one or more many product files, with each file containing product information corresponding to a unique specific product with an UID previously assigned thereto. For example, the store account 440 is shown having a product A1 file 441, a product B2 file 442, and a product D1 file 443. Each file contains corresponding product information such as the product's UID, verifier, product name, brand name, etc.

In one operation of the process 200, the manufacturer A account 410 transfers product A1 file 411 and A3 file 413 to the distributor account 430 when the products A1, A3 are sold to the distributor. The manufacturer A account 410 still retains product A2 file 412 which remains in stock. The manufacturer B account 420 can transfer a product B2 file 422 to the distributor account 430 when the product B2 is sold to the distributor. The manufacturer B account 420 still retains product B1 file 421 and product B3 file 423 which remain in stock. The through its distributor account 430, the distributor can thereafter transfer product A1 file 431, and product B2 file 433, to the store account 440 when the products A1, B2 are sold to the store with the store account 440. The distributor account 430 still retains product A3 file 432 which remains in stock. The store, through its store account 440, can transfer the product A1 file 441 to the consumer X account 450, when the product A1 is sold to consumer X with the account 450, and can transfer product B2 file 442, and product D1 file 443, to the consumer Y account 460, when the products B2, D1 are sold to consumer Y with the account 460. The consumer Y can later use their account 460 to transfer product D1 file 461 to the consumer X account 450, when the product D1 is sold to consumer X with the account 450. The consumer Y account is shown as having product B2 file 462 and a product E6 file 463, which correspond to products B2 and 6 that still have not been sold yet. The consumer X account 450 is shown as having the product A1 file 451, the product D1 file 452 and a product C5 file 453 which are products that are in the possession of consumer X.

Figure 5:
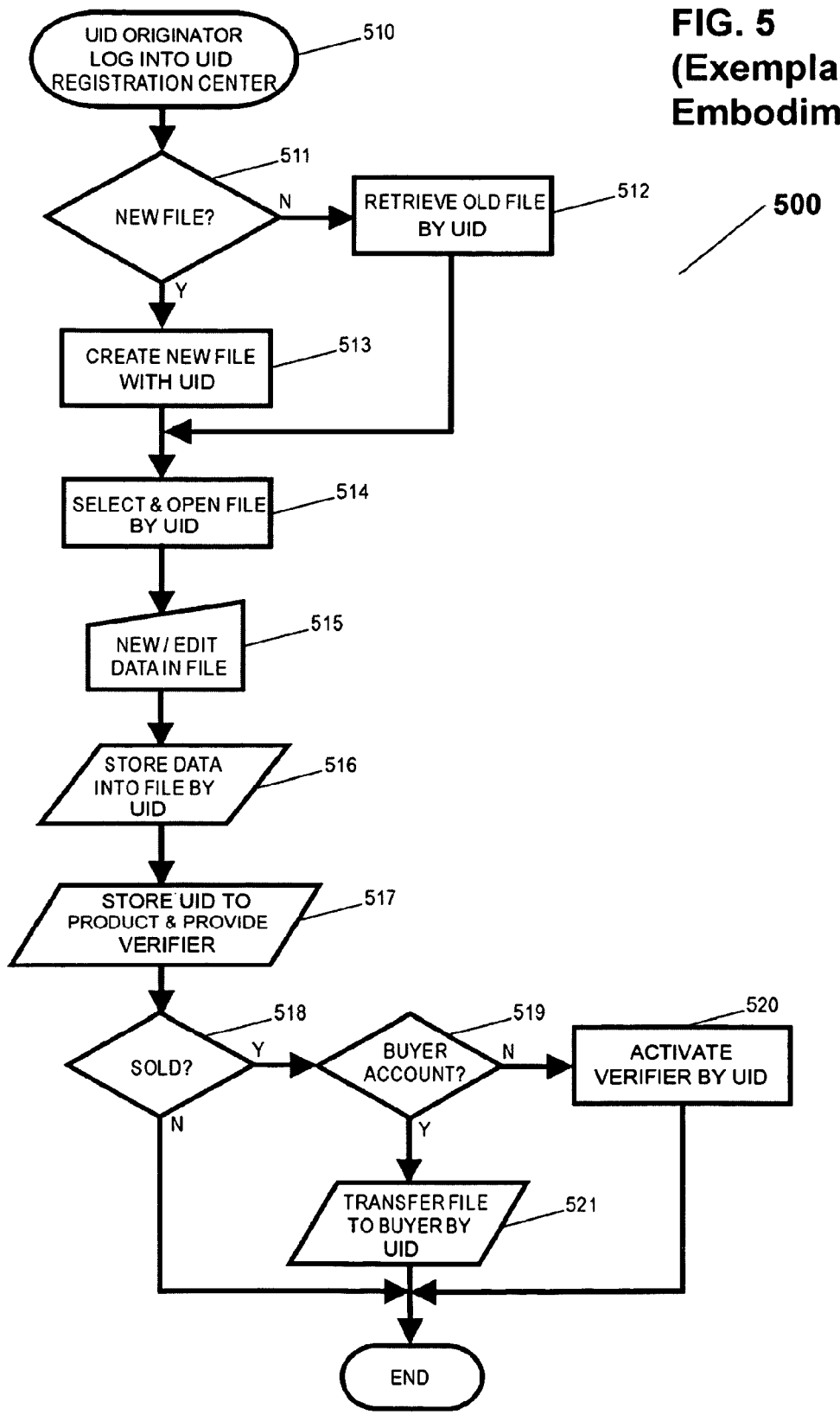
FIG. 5 is a process flow diagram of an exemplary embodiment of a product manufacturer UID registration center account set-up, configuration, and/or utilization process that may be implemented in, and utilized in conjunction with, the inventive system infrastructure of FIG. 4.

Referring now to FIG. 5, an exemplary embodiment of a process for enabling an UID originator (e.g., UID originator 106, a product 102 manufacturer, etc.) UID registration center 120a account set-up, configuration, and/or utilization, is shown as a process 500, that may be implemented in, and utilized in conjunction with, the inventive system infrastructure 100 of FIG. 3. The process 500, by way of example, provides one contemplated representation of the process of a manufacturer (or other UID originator 106) creating UIDs which are then stored in UID components 10, 10a, 50, 50a (of FIGS. 1A to 2B) or in UID component 104 of FIG. 3, that would be incorporated in corresponding electronic (or other) products 102, and then transferring the UID and product-related information (e.g., at least one of: the ownership rights to the product, product information, manufacturer contact, etc.), to a corresponding product record (referred to herein as a "file" by way of example only) of a buyer account in the UID database system 126 of the UID registration center 120a.

The UID originator 106 logs into their own pre-existing account at a UID registration center 120a at step 510. The UID originator account preferably contains at least one product file, each containing product-related information such as UID, verifier, product name, brand name etc. At step 511 the UID originator decides whether to use an existing product file or to generate a new one.

If the UID originator uses the old product file, they retrieve old product file by UID at step 512 from database and a table lists all of the old product files. Otherwise, the UID originator can create a new product file by UID at step 513 in a new product file table list. The UID originator then selects and opens the product file by submitting a proper UID at step 514, that matches the desired product file in the table list. The UID originator edits existing data or enters new data in the product file at step 515, such as a verifier, product name, brand name, model number, date, etc. The UID originator then stores the altered/new data into the product file associated with the UID in the UID database system 126 at step 516. The UID is then electronically stored in the product UID component (such as components 10, 10a, 50, 50a, 104 of FIGS. 1A-3), and provides verifier (e.g. by printing a slip with verifier info) at step 517, which may be packed with the product being shipped.

Once the product is sold at step 518, the UID originator determines whether the buyer has an account in the UID database system 126, at step 519. If the buyer has an account, the UID originator then transfers the product file to the buyer's account by reassigning the product UID to the buyer's account at step 521. Otherwise, the UID originator activates the verifier linked to the product UID being sold at step 520, to enable buyer (e.g., consumer) registration.

Figure 6:
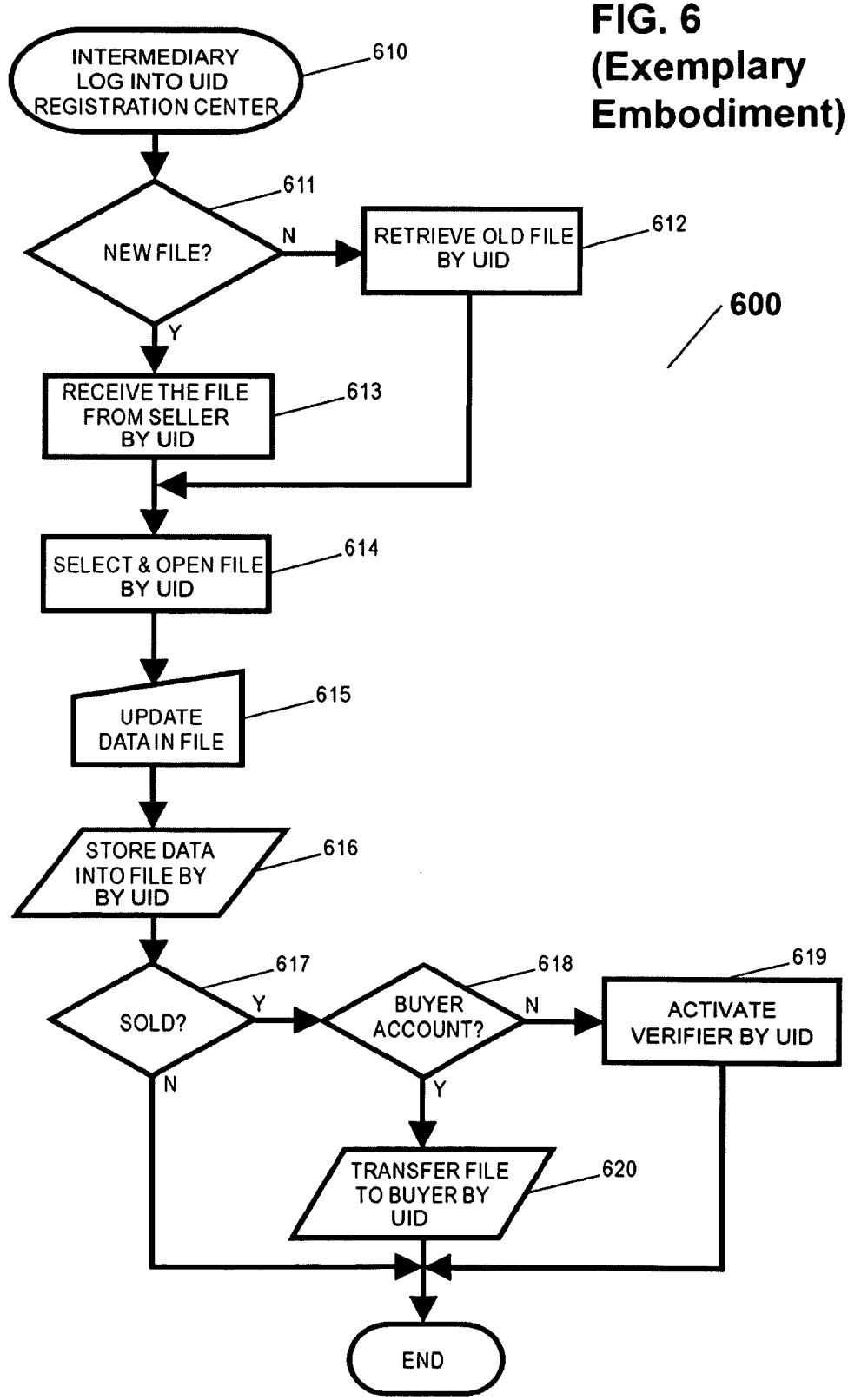
FIG. 6 is a process flow diagram of an exemplary embodiment of a product sales intermediary UID registration center account set-up, configuration, and/or utilization process that may be implemented in, and utilized in conjunction with, the inventive system infrastructure of FIG. 4.

Referring now to FIG. 6, an exemplary embodiment of a product sales intermediary (distributor, store, e-commerce seller, etc.) UID registration center 120a account set-up, configuration, and/or utilization, is shown as a process 600, that may be implemented in, and utilized in conjunction with, the inventive system infrastructure 100 of FIG. 3. The process 600 by way of example provides one contemplated representation of a process of an intermediary party 112 (of FIG. 3), receiving or retrieving a UID database system 126 product file, and transferring it to a buyer account in the UID database system 126 of the UID registration center 120a.

The intermediary party 112 logs in at the UID registration center 120a at step 610, and accesses the intermediary party 112's own pre-existing account. The intermediary party 112 decides whether to use an existing product file or to generate a new one at step 611. If the intermediary party 112 uses the old product file, then the old product file is retrieved at step 612 from the UID database system 126 by submitting the UID thereto, or selected from a table lists all of pre-existing product files. Otherwise, the product file is received from a product seller through receipt and submission of UID at step 613 (where for example multiple product UIDs and product files may be received through a transfer-in product files table list). Then the intermediary party 112 selects and opens the product file by submitting the corresponding UID at step 614, present in the table list of the account's product files. Product data is updated in product file at step 615, such as the owner info, e-mail address, lost, stolen, etc. Then the data is stored into product file associated with UID in the UID database system 126 at step 616. Once the product is sold, at step 617 the intermediary party 112 verifies whether the buyer has an active UID database system 126 account in the UID registration center 120a at step 618. If the buyer has the account, the intermediary party 112 then transfers the product file to the buyer account by use of UID at step 620. Otherwise, the intermediary party 112 activates the verifier associated with the UID at step 619 for buyer (e.g., consumer) registration.

Figure 7:
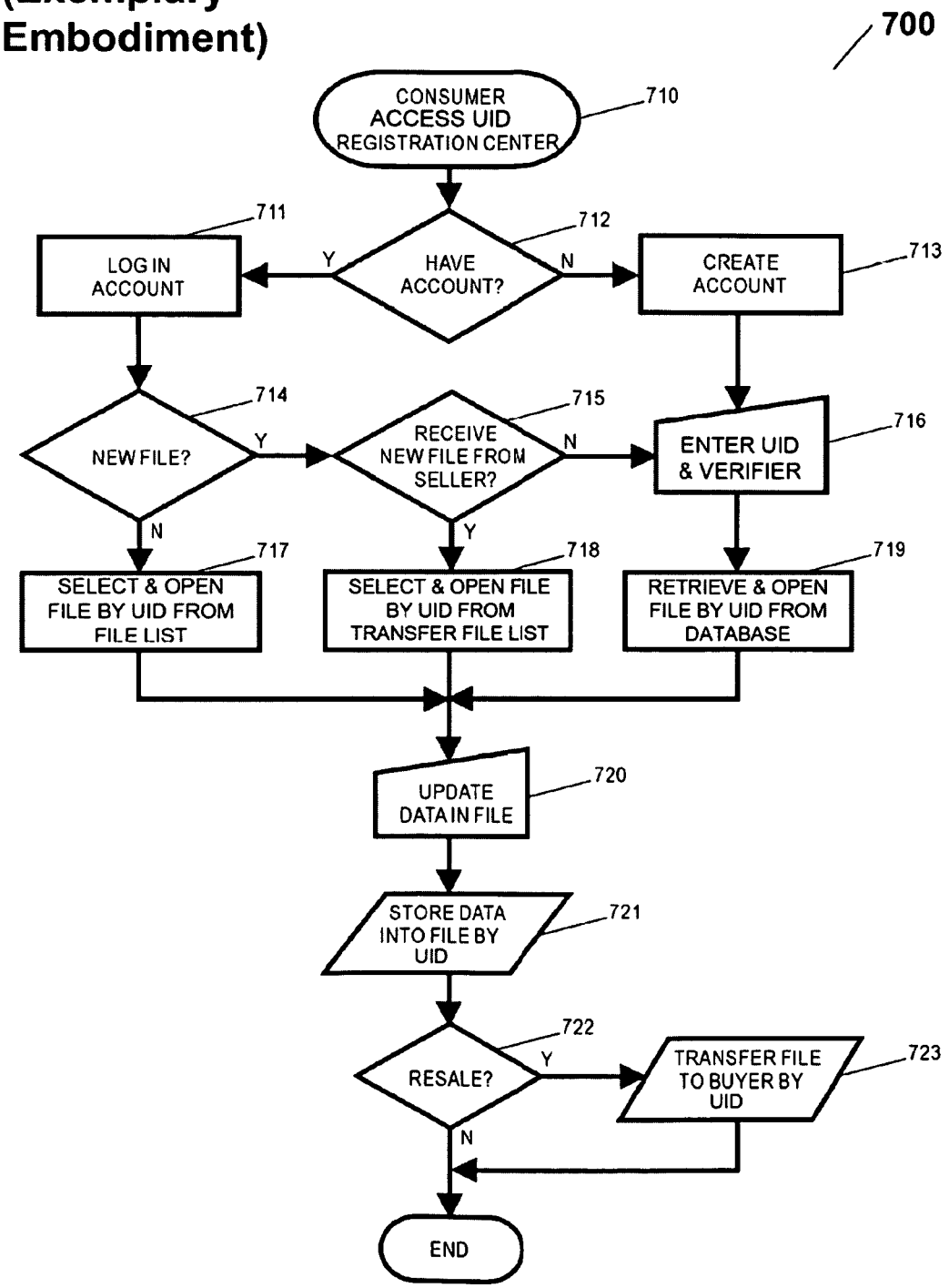
FIG. 7 is a process flow diagram of an exemplary embodiment of a product consumer UID registration center account set-up, configuration, and/or utilization process that may be implemented in, and utilized in conjunction with, the inventive system infrastructure of FIG. 4.

Referring now to FIG. 7, an exemplary embodiment of a process for consumer UID registration center 120a account set-up, configuration, and/or utilization is shown as a process 700, that may be implemented in, and utilized in conjunction with, the inventive system infrastructure 100 of FIG. 3. The process 700, by way of example, provides one contemplated representation of the process of a consumer creating an account, receiving or retrieving a UID registration center 120a UID database system 126 product file, and transferring it to another buyer account in the UID database system 126 of the UID registration center 120a.

When the consumer purchases the product, they access the UID registration center 120a at step 710. At step 712, the process determines whether or not the consumer already has an account in the UID database system 126. If the consumer does not have an account, an account is created at step 713 and the product UID and corresponding verifier (received by consumer from the party previously selling the product to them) is entered at step 716. Then, the product file is retrieved (through use of UID) from the UID database system 126, and opened at step 719, so that product file data can be updated or changed in the product file at step 720 (such as changing the owner's name, e-mail address, etc.) If the consumer has an account, then the consumer logs into the account at step 711 and decides whether or not to create a new product file at step 714. If a new product file is not to be created (e.g., the product file is already in the consumer account), the consumer just selects and opens the product file by use of UID from a product files table at step 717, and conducts data management in the product file at step 720, such as marking the product as status as being lost, stolen, etc.

If a new product file is created, then the consumer selects whether the product file was transferred in from the seller at step 715. If the product file is not transferred in, then the consumer enters the UID and verifier at step 716 to retrieve and open the product file by UID from database at step 719, and updates the data in the product file at step 720. If the product file is transferred in, then the consumer selects and opens the product file by use of the UID from a transfer product files list at step 718, and updates the data in the product file at step 720. After the product data is updated in the product file at step 720, then the updated data is stored in the product file associated with the UID at step 721. If the consumer later desires to resell the product at a later step 722, the product file is transferred to the new buyer account by use of UID at step 723.

Figure 8:
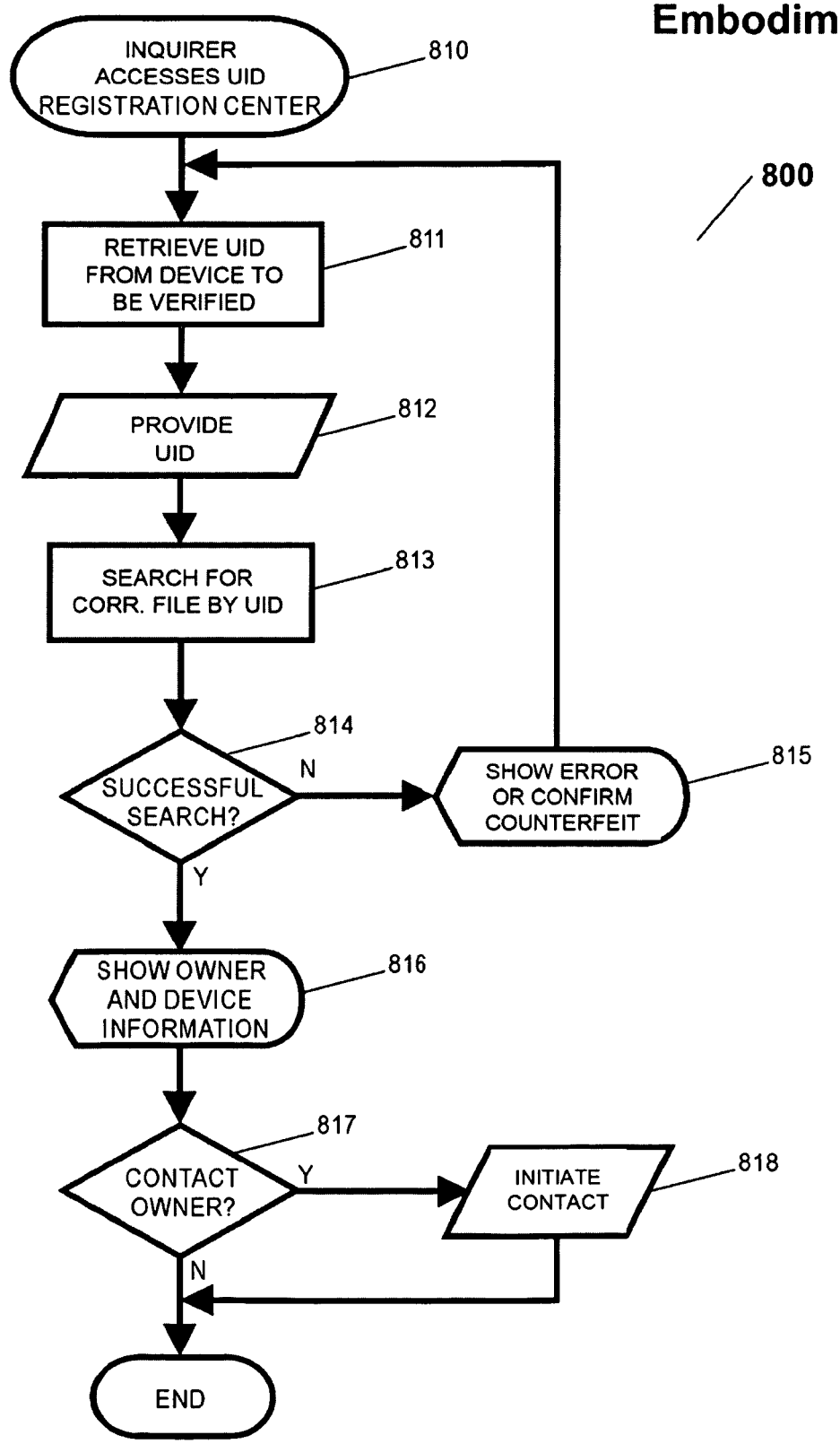
FIG. 8 is a process flow diagram of an exemplary embodiment of a third party (law enforcement, misc. inquirer) UID registration center account set-up, configuration, and/or utilization process that may be implemented in, and utilized in conjunction with, the inventive system infrastructure of FIG. 4.

Referring now to FIG. 8, an exemplary embodiment of a process for a third party (law enforcement, finder of a lost or misplaced product, miscellaneous inquirer, etc.) UID registration center 120a account set-up, configuration, and/or utilization, is shown as a process 800, that may be implemented in, and utilized in conjunction with, the inventive system infrastructure 100 of FIG. 3. The process 800, by way of example provides one contemplated representation of the process of an end-user party 110 such as a product finder, law enforcement personnel, etc., who wants to verify product information in the UID database system 126 of the UID registration center 120a.

The inquirer can just access the UID registration center 120a at step 810 and read or scan the UID from the product at step 811. They may then enter UID and submit it to the UID registration center 120a at step 812. The UID control system 124 will then search for the corresponding product file, by use UID, in the UID database system 126, at step 813. At step 814, the process 800 determines if the search is successful. If the search is not successful, then the process 800 shows the input UID as being a wrong or a counterfeit entry at step 815. If the search is successful, then the process 800 shows the product owner information (and optionally additional product information) at step 816. If there is determination of a need to contact the owner (such as the product status showing up as being "lost" or "stolen") at step 817, then the legal owner of the product is contacted at step 818.

Thus, while there have been shown and described and pointed out fundamental novel features of the inventive system and method as applied to preferred embodiments thereof, it will be understood that various omissions and substitutions and changes in the form and details of the products and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A data processing system for selectively managing at least one information item related to the product, comprising: register means for over at least one communication network, to register and/or store product's information in at least one registration center, wherein said product's information comprises at least an assigned unique identification code associated to a product and the product's data file or record, in a corresponding account owned by at least one authorized party, wherein said unique identification code is one of plural information items in said product data file or record stored in a database located in said registration center, wherein said registration center database comprises at least one product's end-user and/or product's owner account owned by said at least one authorized party, further comprising:

a data management system for said at least one registration center, responsive to said at least one authorized party, operable to:

selectively register said unique identification code associated with the product, in a product data file or record in a corresponding account owned by said at least one authorized party, associate at least one information item related to the product with said unique identification code, and store said at least one information item in said product data file or record; and verification means for verifying, by said at least one authorized party, said at least one information item related to the product, by supplying at least a unique identification code to said data management system to access at least one of said product data file or record containing said at least one information item;

wherein said at least one product data file or record in an account is owned by at least one authorized party of plural parties, further comprising data management means for selectively transferring said product data file or record involved with the product transaction between the plural parties, in response to transfer said product data file or record by a predetermined authorized party, of current ownership rights of a product from a first authorized party's account, of said at least one authorized party, to a second authorized party's account, of said at least one authorized party;

wherein said data management means is implemented as an Internet website with a graphical user interface, accessible by said first and said second authorized parties, and required verifier comprises at least one of: authorization code request security responsive to a predetermined authorization code provided by a predefined authorized party, or a biometric identity verification of at least one of said first and/or said second parties;

wherein said predetermined authorization code is provided by an originator of said authorized party to an initial authorized party acquiring said ownership rights for the product, and wherein said predetermined authorization code is provided by said initial authorized party to subsequent authorized party acquiring said ownership rights for the product, wherein at least one of said initial authorized party and said subsequent authorized party, comprise said first authorized party;

embedding means for electronically embedding said at least a unique identification code by said authorized party, at a predefined location located in at least a portion of the product, that said unique identification code is not changeable without damaging or destroying the product's functionality; and output means for selectively operable by said at least one authorized party, to retrieve said unique identification code from said product, and to output said unique identification code thereto, for at least one of predefined purpose comprising a product registration, a product verification and a product management corresponding to said registration center.

2. The data processing system of claim 1, wherein said at least one authorized party comprises at least one of: an originator party, a product manufacturer, a product distributor, a store selling the product, an owner of the product, an intended recipient of ownership rights to the product, an end-user, law enforcement personnel, and a party finding a product that has been previously lost or stolen.

3. The data processing system of claim 1, wherein said output means further comprise at least one of:
a display component, incorporated in the product, operable to visually display information, and selectively operable to display said unique identification code to said at least one authorized party in response to a predefined request therefor;
an audio component, incorporated in the product, operable to audibly output information, and selectively operable to audibly output said unique identification code to said at least one authorized party, in response to said predefined request therefor; and
a transmission component, incorporated in the product, operable to transmit to output information, and selectively operable to transmit output said unique identification code to external system, in response to a predefined request therefore, wherein said external system comprises at least one of: reading system, remote system, data communication system, data management system, and data processing system.

4. The data processing system of claim 1, wherein said embedding means further comprise at least one of:
an electronic product component operable to perform at least one predetermined function for the product, and further operable to store said unique identification code at said predefined location therein; and/or
a dedicated electronic component, located at a predetermined position within the product, operable to store said unique identification code therein.

5. The data processing system of claim 4, further configured for use in conjunction with a unique identification code remote data communication system, wherein said embedding means and said output means further comprise a remotely operable electronic component selectively operable to remotely provide said unique identification code, across a predefined transmission distance, to said unique identification code remote data communication system, in response to a command thereto by said at least one authorized party.

6. The data processing system of claim 5, further comprising at least one of a product electrical power source and a dedicated embedding means power source, wherein said remotely operable electronic component is configured for active operation requiring electrical power therefor, said electrical power being provided by at least one of said product electrical power source, or said embedding means power source, such that said remotely operable electronic component is not operable in the absence of provision of electrical power thereto.

7. The data processing system of claim 6, comprising both said product electrical power source and said dedicated embedding means power source, wherein said dedicated embedding means power source is only operable to provide electrical power to the remotely operable electronic component when said product electrical power source is not operable.

8. The data processing system of claim 5, wherein said remotely operable electronic component is configured for passive operation requiring no electrical power therefor, such that said remotely operable electronic component is only operable to provide said unique identification code in response to an authorized command from a unique identification code remote data communication system configured to be operable to passively interface with said passive remotely operable electronic component.

9. The data processing system of claim 5, wherein:
said remotely operable electronic component is implemented and configured utilizing at least one of the following techniques for provision of said unique identification code: radio frequency identification (RFID), Bluetooth, wireless data transmission, RuBee, magnetic contact data transfer, at least one high speed cellular data transmission protocol, and infrared (IR), and
said predefined transmission distance is configured to be at least one of: substantially physical contact between said unique identification code remote data communication system and said product, a predefined proximity distance between said unique identification code remote data communication system and said product, and a line of sight distance between said unique identification code remote data communication system and said product.

10. The data processing system of claim 5, wherein said remotely operable electronic component further comprises a control component means for remote control by at least one predetermined authorized party, to selectively operate said remotely operable electronic component, providing said unique identification code to said data communication system.

11. The data processing system of claim 1, wherein said at least one predefined purpose further comprise at least one of: secure data communication between the product and said registration center, registering the product with said registration center, creating the product data file or record in said registration center, viewing at least one product information item in the product data file or record, updating or changing at least one product information item in the product data file or record, verifying product ownership rights of a particular party, determining a legal status of the product, verifying a possession-claiming party's physical possession of the product, identifying the product's status, and verifying the product's authenticity.

12. The data processing system of claim 1, further comprising data processing means for enabling each of a plurality of authorized parties to register and verify in at least one registration center, for the uniqueness of an intended unique serial number prior to assignment thereof to a corresponding product as said corresponding product's unique identification code.

13. The data processing system of claim 1, wherein said verification means further comprise authorization means for ensuring that said product data file or record is only accessible to said at least one authorized party, by requiring said at least one authorized party to provide, to said verification means, proof of an authorization to access said product data file or record.

14. The data processing system of claim 13, wherein said authorization means comprise a verifier requiring an authorization code for access therethrough, and wherein said proof of an authorization to access said product data file or record, comprises said authorization code.

15. The data processing system of claim 14, wherein said authorization code is provided to said at least one authorized party by another authorized party having previous ownership rights to the product.

16. The data processing system of claim 1, wherein said data management means further comprise authorization means for transferring said product data file or record, in addition to said current ownership rights, from said first authorized party's account to said second authorized party's account, in response to said authorization to complete said product data file or record transaction.

17. The data processing system of claim 1, wherein said data management system is configured for use with an electronic commerce system operable to enable a selling party to generate an electronic posting offering a predetermined product for sale in accordance with predetermined sales posting criteria, wherein said data management system further comprises a sales posting verification system, interfaced with said electronic commerce system, operable to:
 enable said selling party to provide, to said data management system, a corresponding predetermined unique identification code for said predetermined product being offered for sale, in conjunction with at least a portion of product sales information from said electronic posting, and seller identity information;
 verify said selling party's compliance with said predetermined sales posting criteria, by comparing said predetermined unique identification code, said seller identity information, and said at least a portion of product sales information with information available in a predetermined product data record corresponding to said predetermined unique identification code; and
 when said predetermined sales posting criteria are successfully verified, enabling said selling party to complete said electronic posting, and when said predetermined sales posting criteria are not verified, preventing said selling party from completing said electronic posting.

18. A data processing system for selectively managing, over at least one communication network, a plurality of information items related to a product, and for data communication between the product and at least one registration center, comprising:
 register means for over at least one communication network, to register and/or store product's information in at least one predefined registration center, wherein said product's information comprises at least an assigned unique identification code associated to a product and the product data file or record, in a corresponding account owned by at least one authorized party, wherein said unique identification code is one of plural information items in said product data file or record stored in a database located in said registration center, wherein said registration center database comprises at least one product's end-user and/or product's owner account owned by said at least one authorized party, further comprising:
 a data management system for said at least one registration center, responsive to said at least one authorized party, operable to:
  selectively register said unique identification code associated with the product, in a product data file or record in a corresponding account owned by said at least one authorized party, associate at least one information item related to the product with said unique identification code, and store said at least one information item in said product data file or record; and verification means for verifying, by said at least one authorized party, said at least one information item related to the product, by supplying at least a unique identification code to said data management system to access at least one of said product data file or record containing said at least one information item;
 wherein said at least one product data file or record in an account is owned by at least one authorized party of plural parties, further comprising data management means for selectively transferring said product data file or record involved with the product transaction between the plural parties, in response to transfer said product data file or record by a predetermined authorized party, of current ownership rights of a product from a first authorized party's account, of said at least one authorized party, to a second authorized party's account, of said at least one authorized party;
 wherein said data management means is implemented as an Internet website with a graphical user interface, accessible by said first and said second authorized parties, and required verifier comprises at least one of: authorization code request security responsive to a predetermined authorization code provided by a predefined authorized party, or a biometric identity verification of at least one of said first and/or said second parties;
 wherein said predetermined authorization code is provided by an originator of said authorized party to an initial authorized party acquiring said ownership rights for the product, and wherein said predetermined authorization code is provided by said initial authorized party to subsequent authorized party acquiring said ownership rights for the product, wherein at least one of said initial authorized party and said subsequent authorized party, comprise said first authorized party;
 embedding means for electronically embedding said at least a unique identification code by an authorized party of plural authorized parties, at a predefined location located in at least a portion of the product, that said unique identification code is not changeable without damaging or destroying the product's functionality; and
 an information management system for at least one said registration center operable to:
  enable configuration, storage, access and management of at least one account for each of the plural authorized parties, wherein each said at least one account comprises at least one product data file or record corresponding to the product and the product-associated information, and configured for at least one of storing, viewing, editing, updating, marking and managing at least a portion of the plural product-associated information corresponding to the said product and at least comprising said unique identification code, wherein said product-associated information comprises the information linked within said communication network corresponding to said unique identification code;
  enable said plural authorized parties to at least one of access and manage, a least a portion of information contained in said product data file or record; and
  enable said product to secure data communication with said registration center, wherein said data communication comprises at least one of wired and wireless.

19. The data processing system of claim 18, wherein said at least one authorized party comprises at least one of: an originator party, a product manufacturer, a product distributor, a store selling the product, an owner of the product, an intended recipient of ownership rights to the product, an end-user, law enforcement personnel, and a party finding a product that has been previously lost or stolen.

20. The data processing system of claim 18, wherein said embedding means further comprise at least one of:
an electronic component operable to perform at least one predetermined function for the product, and further operable to store said unique identification code at said predefined location therein; and/or
a dedicated electronic component, located at a predetermined position within the product, operable to store said unique identification code therein.

21. The data processing system of claim 20, further comprising: a remotely operable electronic component selectively operable to remotely provide said unique identification code, in response to a command thereto by said at least one authorized party, wherein said electronic component is implemented and configured utilizing at least one of the following techniques for provision of said unique identification code: radio frequency identification (RFID), Bluetooth, wireless data transmission, RuBee, magnetic contact data transfer, at least one high speed cellular data transmission protocol, and infrared (IR).

22. The data processing system of claim 18, wherein said data management system is configured for use with an electronic commerce system operable to enable a selling party to generate an electronic posting offering a predetermined product for sale in accordance with predetermined sales posting criteria, wherein said data management system further comprises a sales posting verification system, interfaced with said electronic commerce system, operable to:
enable said selling party to provide, to said data management system, a corresponding predetermined unique identification code for said predetermined product being offered for sale, in conjunction with at least a portion of product sales information from said electronic posting, and seller identity information;
verify said selling party's compliance with said predetermined sales posting criteria, by comparing said predetermined unique identification code, said seller identity information, and said at least a portion of product sales information with information available in a predetermined product data record corresponding to said predetermined unique identification code; and
when said predetermined sales posting criteria are successfully verified, enabling said selling party to complete said electronic posting, and when said predetermined sales posting criteria are not verified, preventing said selling party from completing said electronic posting.

23. A data processing system for selectively managing, over at least one communication network, a plurality of information items related to a product, and for data communication between the product and registration center, the plural information items including at least a unique identification code associated with the product, comprising:
register means for over at least one communication network, to register and/or store product's information in at least one registration center, wherein said product's information comprises at least an assigned unique identification code associated to a product and the product's data file or record, in a corresponding account owned by at least one authorized party, wherein said unique identification code is one of plural information items in said product data file or record stored in a database located in said registration center, wherein said registration center database comprises at least one product's end-user and/or product's owner account owned by said at least one authorized party, further comprising:
a data management system for said at least one registration center, responsive to at least one authorized party, operable to:
selectively register said unique identification code associated with the product, in a product data file or record in a corresponding account owned by said at least one authorized party, associate at least one information item related to the product with said unique identification code, and store said at least one information item in said product data file or record; and verification means for verifying, by said at least one authorized party, said at least one information item related to the product, by supplying at least a unique identification code to said data management system to access at least one of said product data file or record containing said at least one information item;
wherein said at least one product data file or record in an account is owned by at least one authorized party of plural parties, further comprising data management means for selectively transferring said product data file or record involved with the product transaction between the plural parties, in response to transfer said product data file or record by a predetermined authorized party, of current ownership rights of a product from a first authorized party's account, of said at least one authorized party, to a second authorized party's account, of said at least one authorized party;
wherein said data management means is implemented as an Internet website with a graphical user interface, accessible by said first and said second authorized parties, and required verifier comprises at least one of: authorization code request security responsive to a predetermined authorization code provided by a predefined authorized party, or a biometric identity verification of at least one of said first and/or said second parties;
wherein said predetermined authorization code is provided by an originator of said authorized party to an initial authorized party acquiring said ownership rights for the product, and wherein said predetermined authorization code is provided by said initial authorized party to subsequent authorized party acquiring said ownership rights for the product, wherein at least one of said initial authorized party and said subsequent authorized party, comprise said first authorized party;
embedding means for electronically embedding said at least a unique identification code by said authorized party, at a predefined location located in at least a portion of the product, that said unique identification code is not changeable without damaging or destroying the product's functionality; and
verification means for verifying said at least one product information item comprises product's ownership, product brand name, model name/number, production date, warranty information, manufacturer, distributor, retail store, e-commerce store, purchase date, return date, status and contact information, by said at least one authorized party, by supplying said at least a unique identification code to said data management system to access at least a portion of said product data file or record containing said at least one product information item, in said at least one corresponding registration center.

24. The data processing system of claim 23, wherein said verification means further comprise authorization means for ensuring that said product data file or record is only accessible to said at least one authorized party, by requiring said at least one authorized party to provide, to said verification means, proof of an authorization to access said product data file or record, wherein said proof of authorization is provided to said at least one authorized party by another authorized party having previous ownership rights to the product.

25. The data processing system of claim 23, wherein said data management system further comprising operable to:
- enable configuration, storage, access and management of said at least one account for said plural authorized parties, and configured for at least one of storing, viewing, editing, updating, marking and managing at least a portion of the plural product-associated information corresponding to the said product and at least comprising said unique identification code, wherein said product-associated information comprises the information linked within said communication network corresponding to said unique identification code;
- enable said plural authorized parties to at least one of access, edit, update, mark and manage, a least a portion of information contained in said product data file or record.

26. The data processing system of claim 23, further comprising:
- data communication means for selectively operable by at least one authorized party of the plural authorized parties or said data management system, to retrieve said unique identification code from said predefined location of the product, and data communication comprises said unique identification code thereto, for at least one predefined purpose comprising a product registration, a product verification and a product management corresponding to said registration center.

27. The data processing system of claim 26, wherein said data management system further comprises said verification means, and herein, said at least one predefined purpose comprises at least one of: secure data communication between the product and said registration center, registering the product with said data management system, creating said product data file or record in said data management system viewing at least one product information item in said product data file or record, updating or changing at least one product information item in said product data file or record, verifying product ownership rights of a particular party, determining a legal status of the product, verifying a possession-claiming party's physical possession of the product, identifying the product's status, and verifying the product's authenticity.

28. The data processing system of claim 23, wherein said data management system is configured for use with an electronic commerce system operable to enable a selling party to generate an electronic posting offering a predetermined product for sale in accordance with predetermined sales posting criteria, wherein said data management system further comprises a sales posting verification system, interfaced with said electronic commerce system, operable to:
- enable said selling party to provide, to said data management system, a corresponding predetermined unique identification code for said predetermined product being offered for sale, in conjunction with at least a portion of product sales information from said electronic posting, and seller identity information;
- verify said selling party's compliance with said predetermined sales posting criteria, by comparing said predetermined unique identification code, said seller identity information, and said at least a portion of product sales information with information available in a predetermined product data record corresponding to said predetermined unique identification code; and
- when said predetermined sales posting criteria are successfully verified, enabling said selling party to complete said electronic posting, and when said predetermined sales posting criteria are not verified, preventing said selling party from completing said electronic posting.

29. The data processing system of claim 23, wherein said at least one authorized party comprises at least one of: an originator party, a product manufacturer, a product distributor, a store selling the product, an owner of the product, an intended recipient of ownership rights to the product, an end-user, law enforcement personnel, and a party finding a product that has been previously lost or stolen.

\* \* \* \* \*